US006979118B1

(12) United States Patent
Mick et al.

(10) Patent No.: US 6,979,118 B1
(45) Date of Patent: Dec. 27, 2005

(54) ESTIMATING COMBUSTOR FLAME TEMPERATURE BASED ON FREQUENCY OF COMBUSTOR DYNAMICS TRANSVERSE MODE

(75) Inventors: Warren James Mick, Altamont, NY (US); Eamon P. Gleeson, Atlanta, GA (US); Willy Steve Ziminsky, Simpsonville, SC (US); Aparna Basker, Alpharetta, GA (US); Fei Han, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 66 days.

(21) Appl. No.: 10/856,773

(22) Filed: Jun. 1, 2004

(51) Int. Cl.$^7$ .......................................... G01K 11/026
(52) U.S. Cl. ...................... 374/117; 73/579; 60/803; 60/39.24
(58) Field of Search ..................... 374/117, 118, 119; 73/579

(56) References Cited

U.S. PATENT DOCUMENTS

| 2,582,232 | A | * | 1/1952 | Cesaro et al. ............... 374/118 |
| 3,611,804 | A | * | 10/1971 | Bentz .......................... 374/118 |
| 4,317,366 | A | | 3/1982 | Tewes et al. |
| 4,909,731 | A | * | 3/1990 | Zinn et al. ................... 432/58 |
| 5,794,549 | A | * | 8/1998 | Carter ........................ 110/347 |
| 6,517,241 | B1 | | 2/2003 | Sanderson |
| 6,565,255 | B2 | | 5/2003 | Sanderson |
| 6,694,832 | B1 | | 2/2004 | Gleeson |
| 6,708,568 | B2 | | 3/2004 | Gleeson |
| 6,715,916 | B2 | | 4/2004 | Tomlinson et al. |
| 2003/0089111 | A1 | | 5/2003 | Benelli et al. |
| 2003/0226392 | A1 | | 12/2003 | Naumiec et al. |
| 2004/0052295 | A1 | * | 3/2004 | Draxton et al. ............. 374/117 |

FOREIGN PATENT DOCUMENTS

| EP | 1 310 737 | 5/2003 |
| GB | 1 216 913 | 12/1970 |
| GB | 2 037 989 | 7/1980 |
| WO | WO 8402187 | 6/1984 |

OTHER PUBLICATIONS

European Search Report; Apr. 30, 2005; 3 pages.

* cited by examiner

Primary Examiner—Diego Gutierrez
Assistant Examiner—Stanley J. Pruchnic, Jr.
(74) Attorney, Agent, or Firm—Nixon & Vanderhye PC

(57) ABSTRACT

A method of determining the temperature inside a combustion liner without making a direct measurement of the actual temperature. The technique is based on a measurement of the frequency of one of the transverse acoustic modes occurring inside the combustion chamber. The frequency is determined from the transverse geometric dimensions of the combustion chamber and the speed of sound in the gas inside the combustion chamber. The speed of sound in the gas is known from thermodynamics to be a function of gas temperature and gas properties. Thus, from a measurement of the resonant frequency and knowing the combustor dimensions and gas properties, the temperature can be determined with accuracy.

18 Claims, 4 Drawing Sheets

ESTIMATING COMBUSTOR FLAME TEMPERATURE BASED ON FREQUENCY OF COMBUSTOR DYNAMICS TRANSVERSE MODE

BACKGROUND OF THE INVENTION

In a can annular combustor system such as the GE Energy Heavy Duty gas turbine series (see FIG. 1) the turbine is typically controlled using exhaust thermocouples to measure the temperature. More specifically, thermocouple measurements are made in the exhaust of the gas turbine after combustion takes place and the combustion products are expanded in the turbine. From the temperature measurements together with other measured parameters, such as compressor discharge pressure and compressor discharge temperature, an estimated firing temperature is determined for the gas turbine. Since this measurement uses exhaust temperature measurements as an input, the estimate generated is time delayed due to velocity time lags in the products of combustion traveling from the combustor to the exhaust and the response constant of the thermocouples.

BRIEF DESCRIPTION OF THE INVENTION

In an embodiment of the invention, rather than estimating the firing temperature from outputs from exhaust thermocouples, combustor temperature is calculated instead from the combustor acoustic signature. This eliminates the velocity time lags and replaces the thermocouple time constant with the time constant of the dynamic pressure sensors. Thus, the estimate updates much faster. In addition, utilizing this method, temperature can be calculated for each combustor chamber that is being fired, as opposed to calculating a single bulk temperature using exhaust thermocouples. This has the advantage of enabling advanced diagnostics on individual combustors.

Thus, the invention may be embodied in a method for determining a combustion temperature in a target combustor of a gas turbine having a compressor, a combustion section including a plurality of combustors, and a turbine through which flows a working fluid, said method comprising: a) determining the resonance frequency of the first transverse acoustic mode of the target combustor of the combustion section; b) applying said frequency as one factor used to determine a combustion temperature in the target combustor.

The invention may also be embodied in a method for determining combustion temperature in a can-annular type combustion section of a gas turbine having a compressor and a turbine is based on factors including a diameter of said combustion cans, the gas constant for the gas, and the ratio specific heats for the gas, the method comprising: a) determining the resonance frequency of the first transverse acoustic mode of combustors of the combustion section; b) applying said frequency as one factor used to determine a combustion temperature in the combustors.

BRIEF DESCRIPTION OF THE DRAWINGS

These and other objects and advantages of this invention will be more completely understood and appreciated by careful study of the following more detailed description of the presently preferred exemplary embodiments of the invention taken, in conjunction with the accompanying drawings, in which.

DETAILED DESCRIPTION OF THE INVENTION

The invention is embodied in a non-intrusive and simple method for determining the bulk-temperature inside a combustion chamber of a gas turbine employing a can-annular combustor with the objective of using the measured temperature for control of the gas turbine and also as a diagnostic for the combustion process.

Figure 2:
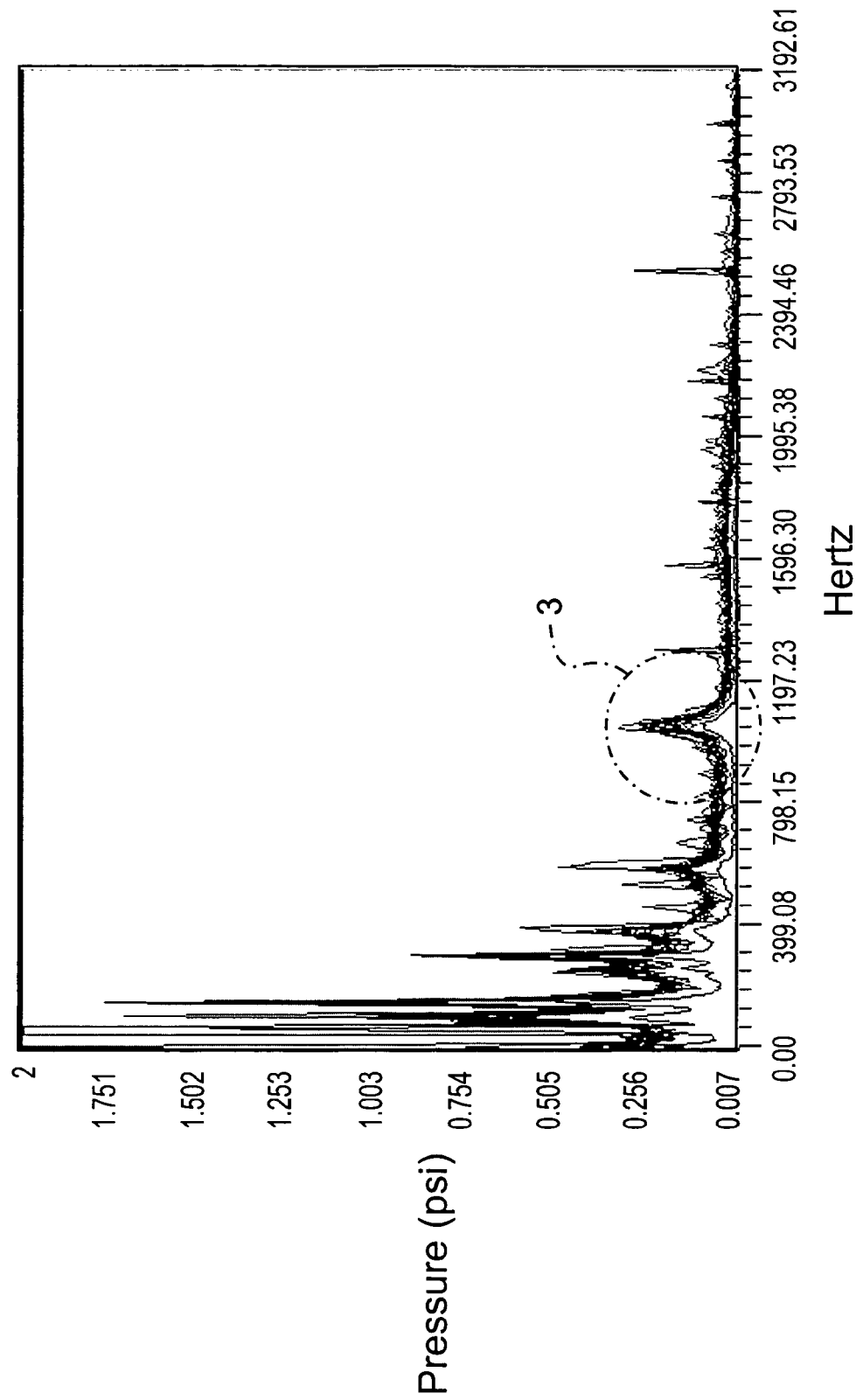
FIG. 2 is a dynamic pressure spectrum for an exemplary combustor showing transverse mode of dynamic pressure.
Figure 3:
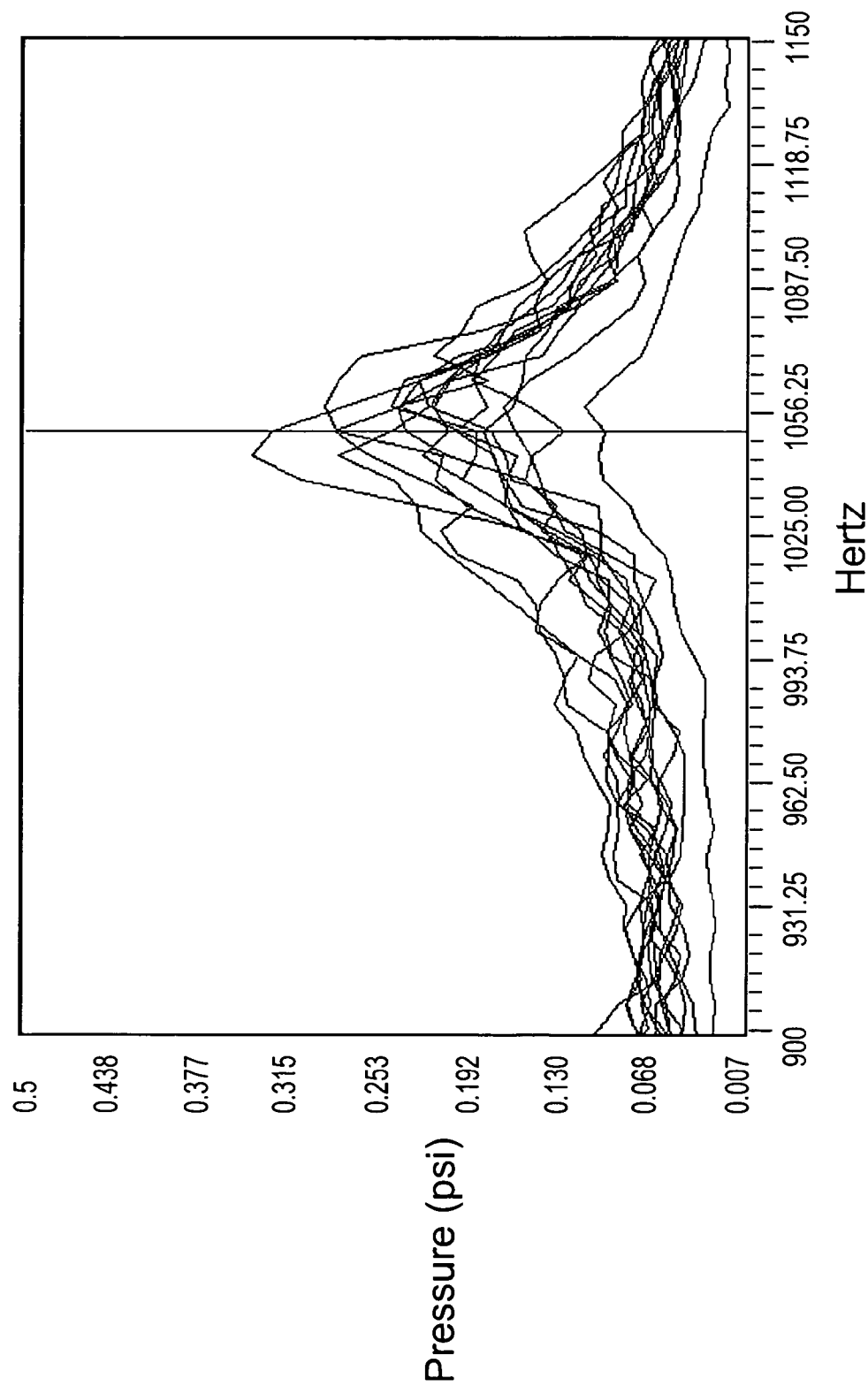
FIG. 3 is a view of detail 3 from FIG. 2, showing transverse mode of dynamic pressure in the range of about 850–1150 hertz.

The method involves the following steps. First, the combustion noise signal from inside each combustor on a gas turbine is measured using a dynamic pressure transducer. Examples of suitable dynamic pressure transducers are disclosed by way of example in U.S. Pat. No. 6,708,568, the entire disclosure of which is incorporated herein by this reference. The signal from each transducer is processed using spectral analysis techniques to isolate the frequency of the transverse mode of interest. The frequency of the transverse mode is known to line in the frequency range of 850 to 1150 hertz. To determine the actual frequency for each can, the peak amplitude within this frequency range is determined from the spectrum plot (FIGS. 2 and 3). Thus, the frequency is simply the frequency corresponding to the peak amplitude. Exemplary data is listed in Table 1 and depicted in FIG. 4. In an embodiment of the invention, this frequency is correlated to the temperature of the gas inside the combustor using known acoustic and thermodynamic relations.

For a combustor chamber, the resonant frequency (f) of the first transverse acoustic mode is given by the following equation:

$$f = (ac)/(\pi D)$$

where c=speed of sound in the gas; a=1.84 (a fixed constant related to acoustic mode) and D=the equivalent inside diameter of the combustion chamber in meters. The value of D is determined based upon the shape and dimensions of the combustion liner. For a tapered liner, the equivalent liner diameter is:

$$D = \frac{D1}{1 + \frac{D1 - D2}{2D1}}$$

where D1 is the upstream (larger) diameter and D2 is the downstream (smaller) diameter. For a straight, i.e. cylindrical combustor chamber, the equivalent diameter is simply the diameter D=D1=D2.

The speed of sound is given by the equation $$c = (\gamma RT)^{1/2}$$

where γ=the specific heat ratio for the gas (a given constant for the air inside the combustor); R=the gas constant for the gas; T=the gas temperature.

These relations can be combined and then solved for the unknown gas temperature as follows:

$$f = [a(\gamma RT)^{1/2}]/(\pi D)$$

so that, $T = (f\pi D/a)^2/(\gamma R)$

Substituting values for a, γ, and R in an exemplary case:

$$T_{flame} = (f\pi D/1.841)^2/(1.4 \cdot 286),$$

where $T_{flame}$ is in Kelvin and D (equivalent liner diameter) is in meters.

In English units:

$$T_{flame} = \{[(0.0254 f\pi D/1.841)^2/(1.4 \cdot 286)] - 273.15\} \cdot 9/5 + 32,$$

where $T_{flame}$ is in Fahrenheit and D (equivalent liner diameter) is in inches.

FIG. 2 shows a frequency spectrum of the dynamics pressure of each of 14 combustion cans or chambers. As can be seen from the detail in FIG. 3, the transverse mode of vibration clearly shows up in all cans around 1050 hertz.

Figure 1:
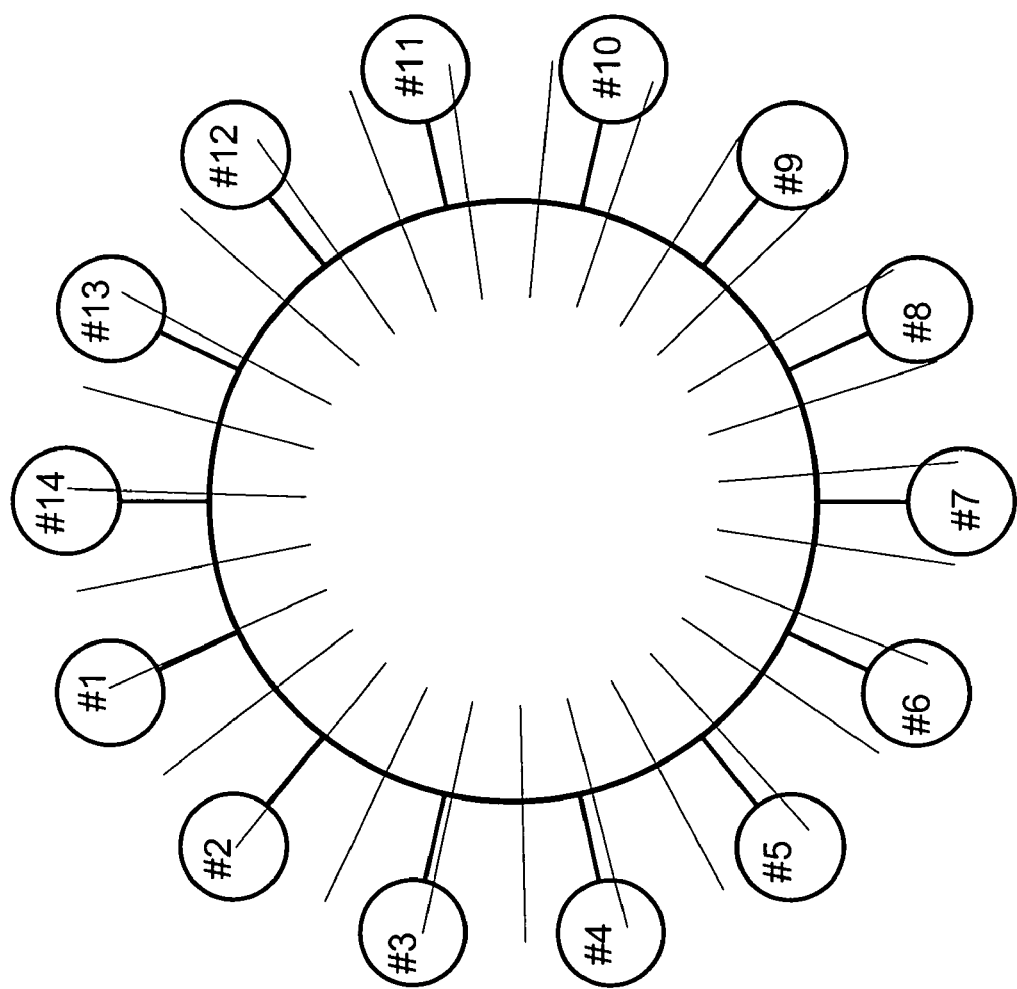
FIG. 1 is a schematic representation of a can annular combustion system.

Referring to Table 1 below and FIG. 4, frequency data is depicted that was derived from the measurement of combustor noise data according to the experimental application of a method embodying the invention to a General Electric (GE) gas turbine having a 14 can-annular type combustor of the type illustrated in FIG. 1.

| Can | Freq Hertz | Exhaust Temp Deg F. | Tflame Deg |
|---|---|---|---|
| 1 | 1039 | 1110 | 2460 |
| 2 | 1033 | 1090 | 2460 |
| 3 | 1033 | 1094 | 2460 |
| 4 | 1027 | 1089 | 2425 |
| 5 | 1045 | 1095 | 2531 |
| 6 | 1039 | 1103 | 2495 |
| 7 | 1033 | 1093 | 2460 |
| 8 | 1020 | 1082 | 2389 |
| 9 | 1008 | 1070 | 2320 |
| 10 | 1033 | 1087 | 2460 |
| 11 | 1027 | 1092 | 2425 |
| 12 | 1039 | 1102 | 2460 |
| 13 | 1033 | 1108 | 2460 |
| 14 | 1033 | 1081 | 2460 |

Figure 6:
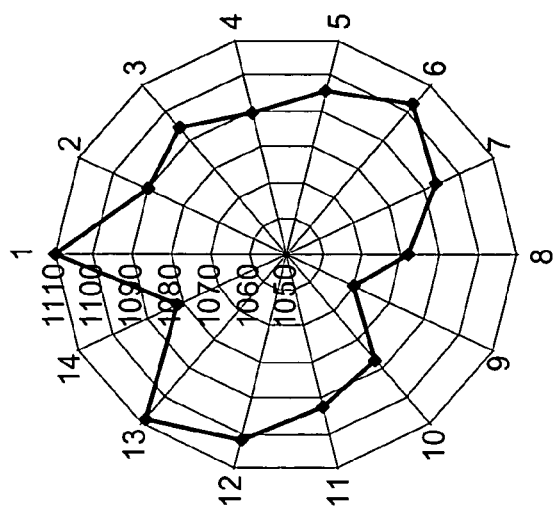
FIG. 6 depicts a swirl compensated exhaust temperature profile in degrees F. in each of 14 cans, as measured with thermocouples from the exhaust of the gas turbine.
Figure 5:
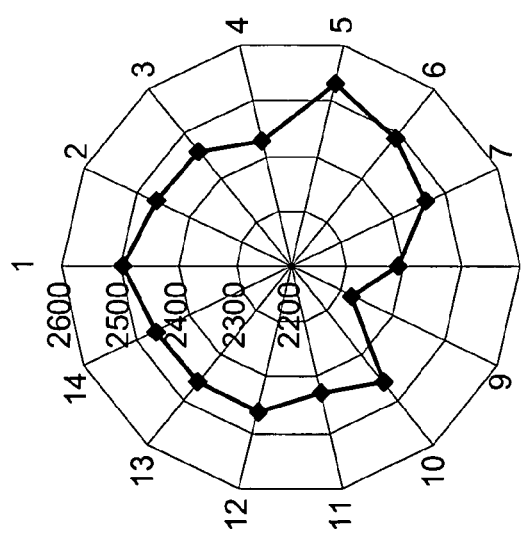
FIG. 5 depicts flame temperature in degrees F. for the 14 cans as calculated according to an embodiment of the invention from the FIG. 4 data.
Figure 4:
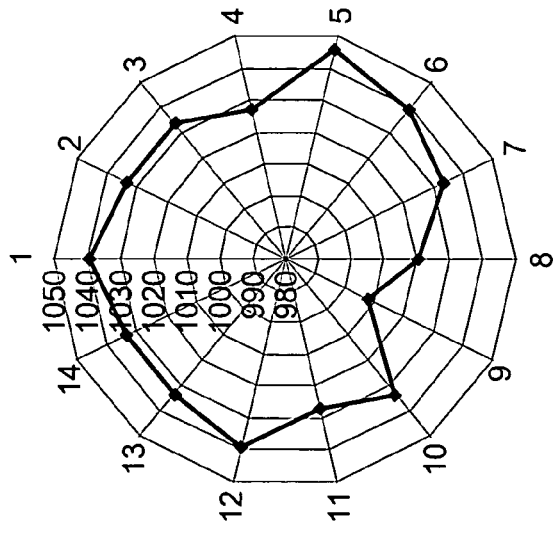
FIG. 4 presents the transverse mode frequency for each of 14 cans based on dynamic pressure measurement in hertz.

FIG. 4 is a plot of the frequency corresponding to the peak amplitude found between 850 hertz and 1150 hertz as illustrated in FIG. 3 and listed in Table 1. As illustrated in FIG. 5, the frequency data was then used with other factors, as detailed above, to calculate the flame temperature within each combustion can of the 14 can combustor. The predicted temperature within each combustion can as listed in Table 1 and depicted in the example of FIG. 5 can be compared to the swirl compensated exhaust temperature distribution estimated in accordance with conventional methods, as shown in FIG. 6. As can be seen, there is a very strong correlation.

As will be appreciated, the temperature calculated according to the invention can be used to provide advanced control and protection of gas turbine combustion systems. Such applications include controlling turbine firing temperature, calculating emission from individual combustor cans, determining the load at which to switch between different combustion modes to avoid a lean blow out, providing a closed loop control algorithm to rapidly modify fuel injection mass flow to prevent a lean blow out when a precursor for such a condition is detected, and providing part load combustor optimization algorithm to provide minimum heat rate.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for determining a combustion temperature in a target combustor of a gas turbine having a compressor, a combustion section including a plurality of combustors, and a turbine through which flows a working fluid, said method comprising:

a) determining the resonance frequency of the first transverse acoustic mode of the target combustor of the combustion section;

b) applying said frequency as one factor used to determine a combustion temperature in the target combustor.

2. A method for determining a combustion temperature as in claim 1 wherein the combustion temperature is a gas turbine firing temperature.

3. A method for determining a combustion temperature as in claim 1, further comprising using the determined combustion temperature to control turbine firing temperature.

4. A method for determining a combustion temperature as in claim 1, further comprising using the determined combustion temperature to calculate emission from said target combustor.

5. A method for determining a combustion temperature as in claim 1, wherein said determining the resonance frequency comprises sensing the combustion noise signal of said target combustor, processing said signal to isolate the frequency of the transverse mode of interest, and using said frequency as one factor for determining the combustion temperature in the target combustor.

6. A method for determining a combustion temperature as in claim 5, wherein said combustion noise signal is sensed based on measurements made by a dynamic pressure transducer.

7. A method for determining a combustion temperature as in claim 1, wherein the combustor is a can-annular type combustor having a plurality of combustor cans, and wherein said determining the resonance frequency comprises sensing the combustion noise signal from each combustor can on the gas turbine, processing each said signal to isolate the frequency of the transverse mode of interest, and using said frequency, respectively, as one factor for determining the combustion temperature in the respective combustor.

8. A method for determining a combustion temperature as in claim 1, wherein said combustion temperature in the target combustor is determined based on factors including a diameter of the target combustor.

9. A method for determining a combustion temperature as in claim 1, wherein said combustion temperature in the target combustor is determined based on factors including a circumference of the target combustor.

10. A method for determining a combustion temperature as in claim 1, wherein said combustion temperature in the target combustor is determined based on factors including a diameter of the target combustor and the gas constant for the gas/working fluid.

11. A method for determining a combustion temperature as in claim 10, wherein said combustion temperature in the target combustor is determined from the following relation:

$$T=(f\pi D/a)^2/(\gamma R)$$

where D=the equivalent inside diameter of the combustion chamber, f=the resonant frequency of the first transverse acoustic mode, a=1.84, γ=the ratio specific heats for the gas in the combustor, and R=the gas constant for the gas.

12. A method for determining combustion temperature in a can-annular type combustion section of a gas turbine having a compressor and a turbine is based on factors including a diameter of said combustion cans, the gas constant for the gas, and the ratio specific heats for the gas, the method comprising:
 a) determining the resonance frequency of the first transverse acoustic mode of combustors of the combustion section;
 b) applying said frequency as one factor used to determine a combustion temperature in the combustors.

13. A method for determining a combustion temperature as in claim 12, wherein the combustion temperature is a gas turbine firing temperature.

14. A method for determining a combustion temperature as in claim 12, further comprising using the determined combustion temperature to control turbine firing temperature.

15. A method for determining a combustion temperature as in claim 12, further comprising using the determined combustion temperature to calculate emission from said combustors.

16. A method for determining a combustion temperature as in claim 12, wherein said determining the resonance frequency comprises sensing the combustion noise signal from each combustor on the gas turbine, processing each said signal to isolate the frequency of the transverse mode of interest, and using said frequency, respectively, as one factor for determining the combustion temperature in the respective combustor.

17. A method for determining a combustion temperature as in claim 15, wherein said combustion noise signal is sensed based on measurements made by a dynamic pressure transducer.

18. A method for determining a combustion temperature as in claim 12, wherein said combustion temperature in the target combustor is determined based on factors including a circumference of the target combustor.

* * * * *